United States Patent [19]

Hiramatsu

[11] Patent Number: 5,448,422
[45] Date of Patent: Sep. 5, 1995

[54] MAGNETIC HEAD DRIVE CIRCUIT INCLUDING CAPACITORS FOR STORING CHARGE TO DRIVE A MAGNETIC HEAD COIL

[75] Inventor: Makoto Hiramatsu, Yokohama, Japan

[73] Assignee: Canon Kabushiki Kaisha, Tokyo, Japan

[21] Appl. No.: 370,833

[22] Filed: Jan. 10, 1995

Related U.S. Application Data

[63] Continuation of Ser. No. 793,093, Nov. 15, 1991, abandoned.

[30] Foreign Application Priority Data

Nov. 16, 1990 [JP] Japan ................. 2-308607

[51] Int. Cl.⁶ ................................. G11B 5/00
[52] U.S. Cl. ........................ 360/59; 360/66; 360/114; 369/13
[58] Field of Search ............... 369/13; 360/114, 60, 360/66, 118; 365/122; 361/17, 155, 156, 187, 189, 170, 166, 167; 307/415

[56] References Cited

U.S. PATENT DOCUMENTS

| | | | |
|---|---|---|---|
| 4,326,133 | 4/1982 | Tasma | 361/155 |
| 4,472,755 | 9/1984 | Praeg | 361/156 |
| 4,716,490 | 12/1987 | Alexamian | 361/155 |
| 5,199,010 | 3/1993 | Adachi et al. | 369/13 |
| 5,229,902 | 7/1993 | Zucker et al. | 360/114 |
| 5,233,577 | 8/1993 | Bakx et al. | 369/13 |
| 5,278,818 | 1/1994 | Zucker et al. | 369/13 |

FOREIGN PATENT DOCUMENTS

| | | | |
|---|---|---|---|
| 55-132521 | 10/1980 | Japan | 360/66 |
| 0801046 | 1/1981 | U.S.S.R. | 360/66 |

*Primary Examiner*—Hoa T. Nguyen
*Attorney, Agent, or Firm*—Fitzpatrick, Cella, Harper & Scinto

[57] ABSTRACT

A drive circuit apparatus for driving a magnetic head includes a magnetic core, a coil wound around the magnetic core, and a unit for supplying current to the coil. The supplying unit includes first and second capacitors and a charging unit such that the second capacitor is charged while the current is supplied to the coil by a charge stored in the first capacitor.

9 Claims, 11 Drawing Sheets

FIG. 6A RECORDING SIGNAL
FIG. 6B SW1
FIG. 6C SW2
FIG. 6D SW3
FIG. 6E SW4
FIG. 6F SW5
FIG. 6G SW6
FIG. 6H VOLTAGE AT POINT g
FIG. 6I VOLTAGE AT POINT h
FIG. 6J CURRENT OF L1
FIG. 6K CURRENT OF L2
FIG. 6L GENERATED MAGNETIC FIELD

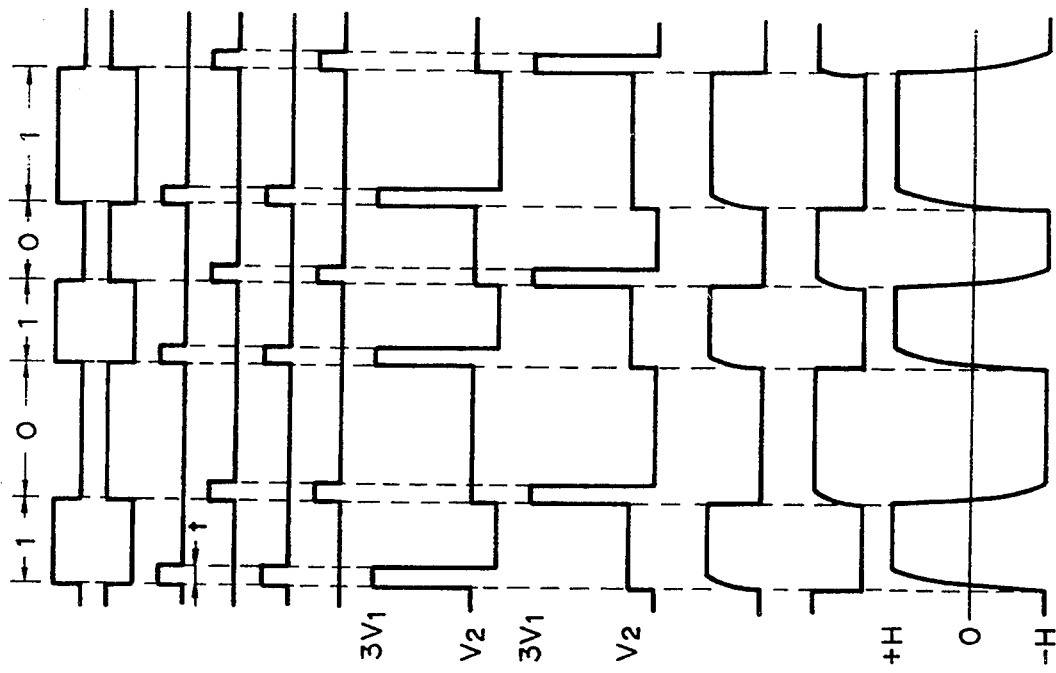

MAGNETIC HEAD DRIVE CIRCUIT INCLUDING CAPACITORS FOR STORING CHARGE TO DRIVE A MAGNETIC HEAD COIL

This application is a continuation of prior application, Ser. No. 07/793,093 filed Nov. 15, 1991, now abandoned.

BACKGROUND OF THE INVENTION

1. Field of the Invention

The present invention relates to a drive apparatus for a magnetic head used in an optomagnetic recording system and, more particularly, to a drive circuit apparatus for a magnetic head used in information recording of a magnetic field modulation scheme.

2. Related Background Art

In recent years, an optomagnetic recording apparatus has received a great deal of attention as a large-capacity external memory for a computer. An optical modulation scheme and a magnetic field modulation scheme are available as existing information recording schemes for the optomagnetic recording apparatus. Of these modulation schemes, the magnetic field modulation scheme has an advantage in that information recording can be performed without decreasing information transfer speed since an overwrite operation can be performed to simultaneously erase recorded information and write new information.

FIG. 1 is a schematic circuit diagram for driving a magnetic head used in the above magnetic field modulation scheme. In the magnetic field modulation scheme, as is known well, a light beam is emitted from a light source such as a semiconductor laser to an information recording medium to increase the temperature of an irradiated portion over a Curie point, and a magnetic field modulated in accordance with a recording signal is applied to this high-temperature portion, thereby changing the direction of magnetization in correspondence with the bit information. The circuit shown in FIG. 1 is an arrangement of a magnetic head using two coils $L_1$ and $L_2$ to generate a bias magnetic field. A switch element SW1 is connected to the coil $L_1$ through a resistor $R_1$, and a switch element SW2 is connected to the coil $L_2$ through a resistor $R_2$. A recording signal is supplied to the control terminal of the switch element SW1, and to the control terminal of the switch element SW2 through an inverter 100. As shown in FIG. 2, the coils $L_1$ and $L_2$ are wound around a magnetic core 101 serving as a magnetic field generation core in opposite directions. Terminals a to d of the coils in FIG. 2 correspond to those in FIG. 1. When a current is supplied from the terminal a to the terminal b, the coil $L_1$ generates a magnetic field having a given direction of polarization. When a current is supplied from the terminal c to the terminal d, the coil $L_2$ generates a magnetic field having a direction of polarization opposite to the given direction.

Assume that the recording signal is set at "1". Since the switch element SW1 is turned on and a current flows through the coil $L_1$, a magnetic field is generated by the coil $L_1$. At this time, since the switch element SW2 is kept off, no magnetic field is generated by the coil $L_2$. On the other hand, when the recording signal is set at "0", the switch element SW1 is kept off, and the switch element SW2 is turned on. Therefore, a magnetic field is generated by the coil $L_2$. The direction of the magnetic field generated by the coil $L_1$ is opposite to that of the magnetic field generated by the coil $L_2$. Therefore, bias magnetic fields having different polarities corresponding to the levels of the recording signals can be generated.

FIG. 3 shows a magnetic head for generating a bias magnetic field by using one coil. In this arrangement, a current is switched and selectively supplied to a coil $L_3$ by using four switch elements SW1 to SW4. The recording signal is directly input to the control terminals of the switch elements SW2 and SW3, and to the switch elements SW1 and SW4 through an inverter 102. The coil $L_3$ is wound around a magnetic core 103, as shown in FIG. 4. By changing a current flow direction, the polarity of the generated magnetic field is changed. Terminals e and f of the coil shown in FIG. 4 correspond to those in FIG. 3.

In the above arrangement, for example, when the recording signal is set at "1", the switch elements SW2 and SW3 are turned on, and a current is supplied to the coil $L_3$ in a direction extending from the terminal f to the terminal e. On the other hand, when the recording signal is set at "0", the switch elements SW1 and SW4 are turned on, and a current is supplied to the coil $L_3$ in a direction from the terminal e to the terminal f. The direction of the magnetic field generated by the coil $L_3$ is changed, and therefore a bias magnetic field corresponding to the level of the recording signal can be generated.

In the magnetic field modulation scheme, the magnetic head is not used to reproduce information. It is, therefore, possible to maximize the distance between a recording medium and the magnetic head. An accident such as a head crash can be prevented. A magnetic field generated by the magnetic head must be larger than that generated by a magnetic recording apparatus such as an HDD. For this purpose, the coil must have a large inductance, and a current flowing through the coil must also be large. In order to always obtain a high-quality reproduced signal, a time (to be referred to as a switching time) required for reversing the magnetic field must be minimized.

In the conventional example described above, in order to satisfy this requirement, a power source voltage applied to the coil must be high. For this purpose, a new power source for the magnetic head is required in an optomagnetic recording apparatus, thus complicating the arrangement of the apparatus and increasing the size and cost of the apparatus.

SUMMARY OF THE INVENTION

The present invention has been made to eliminate the conventional problems described above, and has as its object to provide a simple magnetic head drive apparatus for driving a magnetic field generation coil at a high voltage without arranging a magnetic head high-voltage source.

In order to achieve the above object of the present invention, there is provided a magnetic head drive apparatus having at least one coil and operated so that a direction of a current supplied to the coil is controlled to generate a bias magnetic field corresponding to a recording signal applied to an information recording medium, comprising at least one capacitor (condenser) corresponding to each direction of a magnetic field generated upon supply of the coil current, wherein the capacitor stores a charge during a period in which a magnetic field having a direction corresponding to the capacitor is not generated, and the current is supplied from the charge stored in the capacitor when the magnetic field having the direction corresponding to the capacitor is generated.

BRIEF DESCRIPTION OF THE DRAWINGS

FIGS. 14A to 14L are timing charts showing an operation of the embodiment shown in FIG. 13.

DESCRIPTION OF THE PREFERRED EMBODIMENTS

Figure 1:
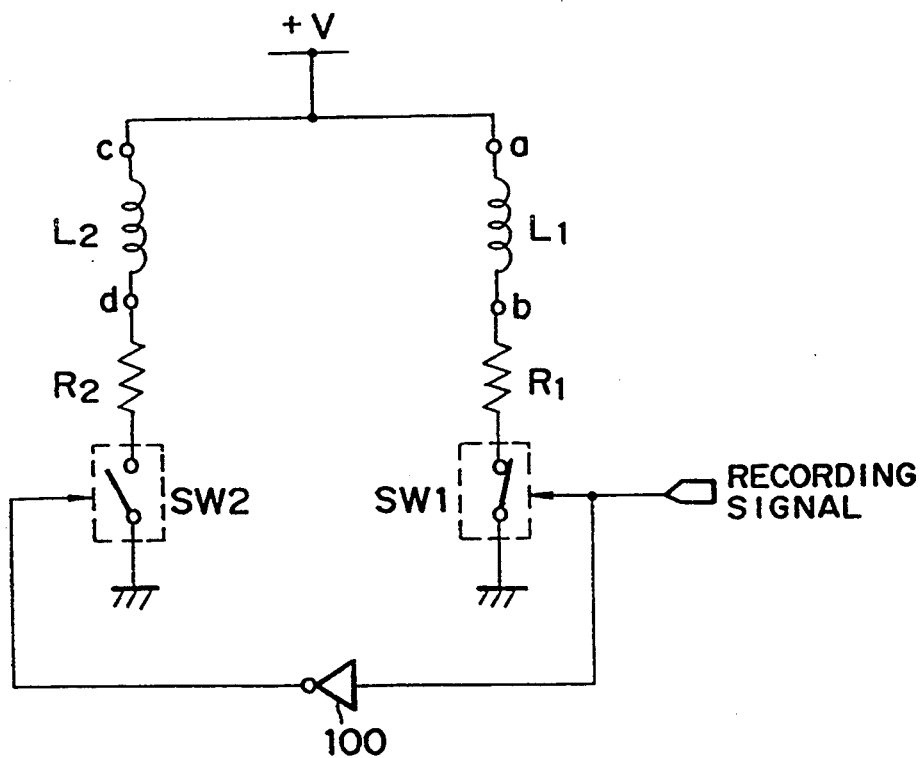
FIG. 1 is a circuit diagram showing a conventional magnetic head drive apparatus.
Figure 2:
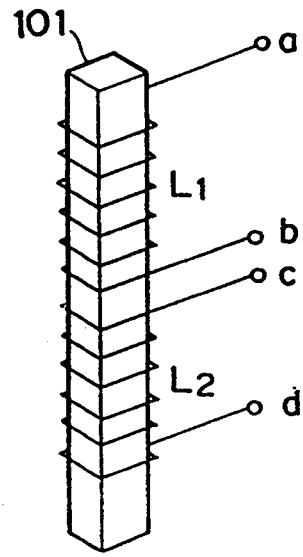
FIG. 2 is a perspective view for explaining states of wound coils of a magnetic head used in the apparatus shown in FIG. 1.
Figure 5:
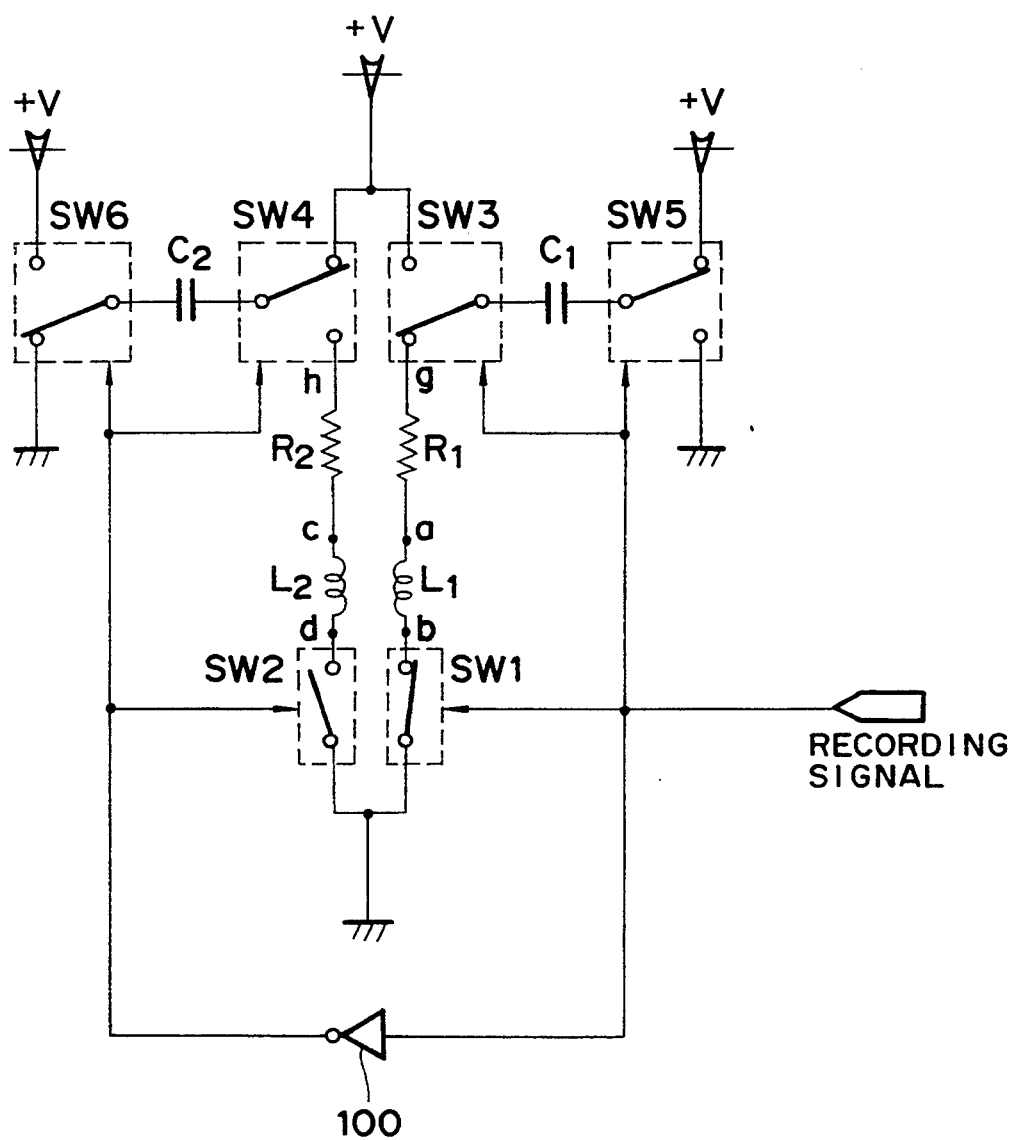
FIG. 5 is a circuit diagram of a magnetic head drive apparatus according to an embodiment of the present invention.

Preferred embodiments of the present invention will be described in detail with reference to the accompanying drawings. FIG. 5 is a circuit diagram showing a drive circuit apparatus for a magnetic head according to an embodiment of the present invention. This embodiment exemplifies a drive apparatus using two coils as in FIGS. 1 and 2. The same parts as in FIG. 1 denote the same parts in FIG. 5, and a detailed description thereof will be omitted.

Referring to FIG. 5, capacitors $C_1$ and $C_2$ are arranged in correspondence with directions of magnetic fields, respectively. A current is supplied to each coil in accordance with a charge of a corresponding capacitor, as will be described later. A switch element SW3 is connected to one terminal of the capacitor $C_1$, and a switch element SW5 is connected to the other terminal of the capacitor $C_1$. The switch element SW3 is driven by the recording signal. While the coil $L_1$ does not generate a magnetic field, the switch element SW3 is connected to the power source side. However, while the coil $L_1$ generates a magnetic field, the switch element SW3 is connected to a resistor $R_1$. A switch element SW5 is similarly driven by the recording signal. While the coil $L_1$ does not generate a magnetic field, the switch element SW5 is connected to ground. However, while the coil $L_1$ generates the magnetic field, the switch element SW5 is connected to the power source side.

Switch elements SW4 and SW6 are connected to the two terminals of the capacitor $C_2$, respectively. The switch elements SW4 and SW6 are driven by a recording signal inverted by the inverter 100. The switch element SW4 is connected to the power source side while the coil $L_2$ does not generate a magnetic field. The switch element SW4 is connected to a resistor $R_2$ while the coil $L_2$ generates a magnetic field. The switch element SW6 is connected to ground while the coil $L_2$ does not generate a magnetic field. However, the switch element SW6 is connected to the power source side while the coil $L_2$ generates a magnetic field. Note that the switch elements SW1 and SW2 are similarly driven by the recording signals. When the recording signal is set at a high level, the switch elements SW1 and SW2 are turned on. When the recording signal is set at a low level, the switch elements SW1 and SW2 are turned off.

Figure 6:
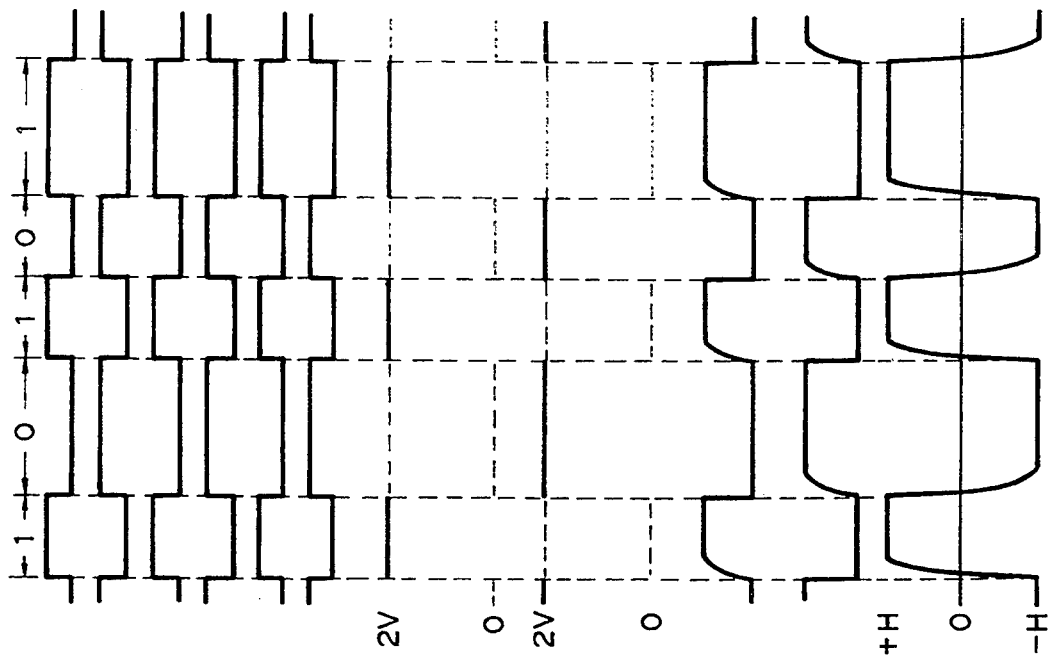
FIGS. 6A to 6L are timing charts showing an operation of the embodiment shown in FIG. 5.

An operation of this apparatus will be described with reference to the timing charts shown in FIGS. 6A to 6L. FIG. 6A shows a recording signal of level "1". As shown in FIGS. 6B, 6D, and 6F, signals of high level are supplied to the switch elements SW1, SW3, and SW5, respectively. Under these conditions, the switch element SW1 is turned on, the switch element SW3 is connected to the resistor $R_1$, and the switch element SW5 is connected to the power source side. That is, the respective switch elements are set in the state shown in FIG. 5. The capacitor $C_1$ is connected between the power source and the resistor $R_1$. The capacitor $C_1$ is charged to a power source voltage V (to be described later). The coil $L_1$ receives a current from the current source including the capacitor $C_1$.

While the recording signal is kept at "1", signals of low level obtained by inverting the recording signal by the inverter 100 are supplied to the switch elements SW2, SW4, and SW6, as shown in FIGS. 6C, 6E, and 6G. In this case, the respective switch elements are set in the state shown in FIG. 5. That is, the switch element SW2 is turned off, the switch element SW4 is connected to the power source side, and the switch element SW6 is connected to ground. The capacitor $C_2$ is connected between the power source and ground. During this period, the capacitor $C_2$ is charged to the power source voltage V. The capacitor $C_1$ is charged to the power source voltage V in the same operation as described above, thereby driving the coil $L_1$, as described above. At this time, a voltage (i.e., a voltage at the negative terminal of the resistor $R_1$) at a point g is 2V as a sum of the power source voltage V and the charge voltage V of the capacitor $C_1$, as shown in FIG. 6H. A voltage twice the power source voltage V is applied to the resistor $R_1$ and the coil $L_1$. A current from the current source including the charge of the capacitor $C_1$ is supplied to the coil $L_1$. The current of the coil $L_1$ is shown in FIG. 6J. A magnetic field $+H$ is generated by the coil $L_1$ by the current of FIG. 6J, as shown in FIG. 6L. The generated magnetic field is applied to an optomagnetic information recording medium such as an optomagnetic disk (not shown). The information recording medium is also irradiated with a laser beam having a predetermined intensity. By the light radiation and the application of the bias magnetic field, bit information corresponding to the recording signal of level "1" is recorded in the optomagnetic disk.

When the recording signal goes to "0" level, the switch element SW1 is turned off, and the switch element SW2 is turned on. In synchronism with the OFF operation of the switch element SW1, the switch element SW3 is connected to the power source side, and the switch element SW5 is connected to ground. Charging of the capacitor $C_1$ is started again. Similarly, in synchronism with the ON operation of the switch element SW2, the switch element SW4 is connected to the resistor $R_2$, and the switch element SW6 is connected to the power source side. In this case, the voltage (i.e., the voltage at the negative terminal of the resistor $R_2$) at the point h is twice the voltage of the power source voltage, as shown in FIG. 6I, because the capacitor $C_2$ has already been charged to the power source voltage. The coil $L_2$ is driven by the voltage twice the power source voltage and receives a current shown in FIG. 6K. As shown in FIG. 6L, a magnetic field $-H$ is generated by the coil $L_1$. When this bias magnetic field is applied to the information recording medium, bit information corresponding to the recording signal of level "0" is recorded. In this manner, the operations of the switch elements are controlled in accordance with the levels of the recording signals. Each coil receives the current corresponding to the voltage twice the power source voltage.

As described above, according to this embodiment, the capacitors $C_1$ and $C_2$ are charged while the corresponding coils do not generate magnetic fields. When the corresponding coils generate the magnetic fields, the charges of the capacitors are used to supply currents to these coils. Therefore, the voltage applied to each coil is the sum of the power source voltage and the charge voltage of the capacitor. That is, the coil is driven at the voltage twice the power source voltage. For this reason, even if the coil has a large inductance, the switching time (rise time of the coil current) of the coil can be shortened. In this case, if the power source voltage is equal to that used in a conventional arrangement, the switching time can be reduced into $\frac{1}{2}$. A new magnetic head high-voltage source need not be arranged. The power source voltage can be doubled by a simple apparatus including the capacitors and the switch elements described above.

Figure 7:
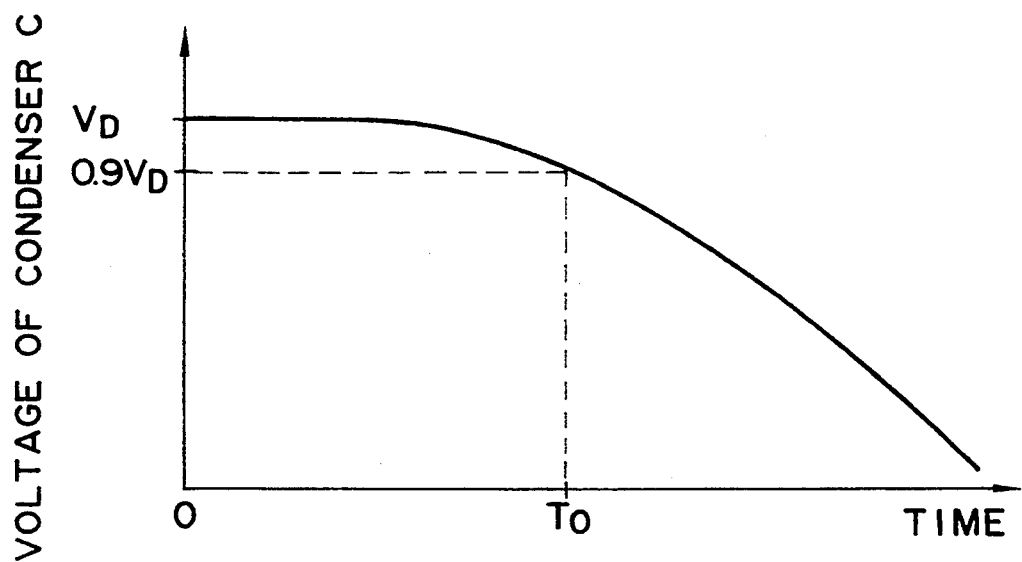
FIG. 7 is a graph showing a discharge curve of a capacitor (condenser) used in the embodiment of FIG. 5.
Figure 8:
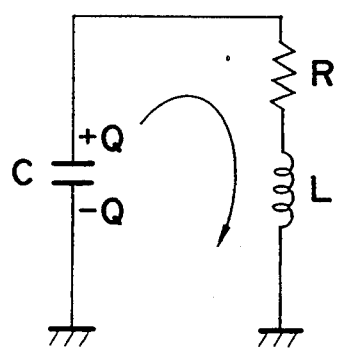
FIG. 8 is an equivalent circuit diagram of a discharge circuit for the embodiment shown in FIG. 5.

In the embodiment of FIG. 5, potentials at the points g and h are lowered as a function of time. Decreases in potentials are shown in FIG. 7. An equivalent circuit during capacitor discharge is shown in FIG. 8. Referring to FIG. 8, R corresponds to $R_1$ and $R_2$, L corresponds to $L_1$ and $L_2$, and C corresponds to $C_1$ and $C_2$. An initial charge stored in the capacitor is defined as Q, and an initial potential is defined as $V_D$.

Referring to FIG. 7, a time $T_0$ required to lower the potential of the capacitor C by 10% for R=0 is given as follows:

$$T_0 \approx \sqrt{1000LC} \qquad (1)$$

That is, unless the duration of the recording signal of level "0" or "1" is longer than $T_0$, an effective voltage cannot be applied to the coil. A longest duration T (to be referred to as a maximum magnetic field reversal time hereinafter) of the recording signal is given as follows:

$$T < T_0 \approx \sqrt{1000LC} \qquad (2)$$

The capacitor C must satisfy the following condition:

$$C > T^2/1000 \times L \qquad (3)$$

Figure 3:
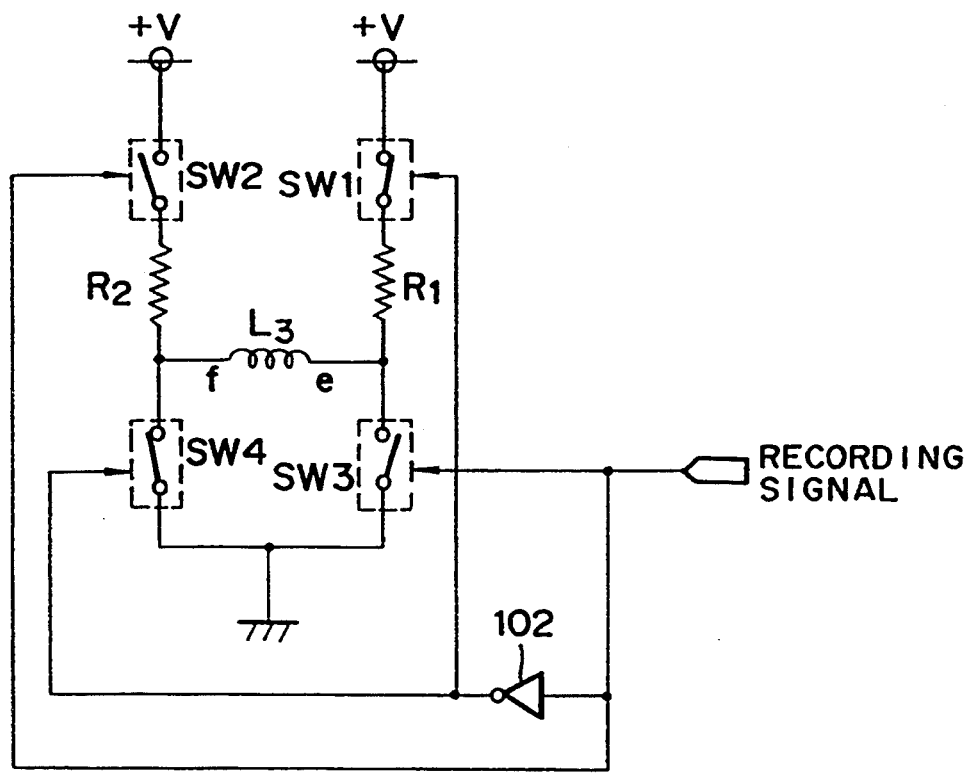
FIG. 3 is a circuit diagram showing another conventional example.
Figure 4:
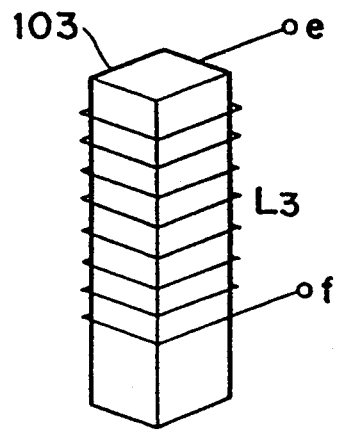
FIG. 4 is a perspective view showing a state of a wound coil of a magnetic head in an apparatus shown in FIG. 3.
Figure 9:
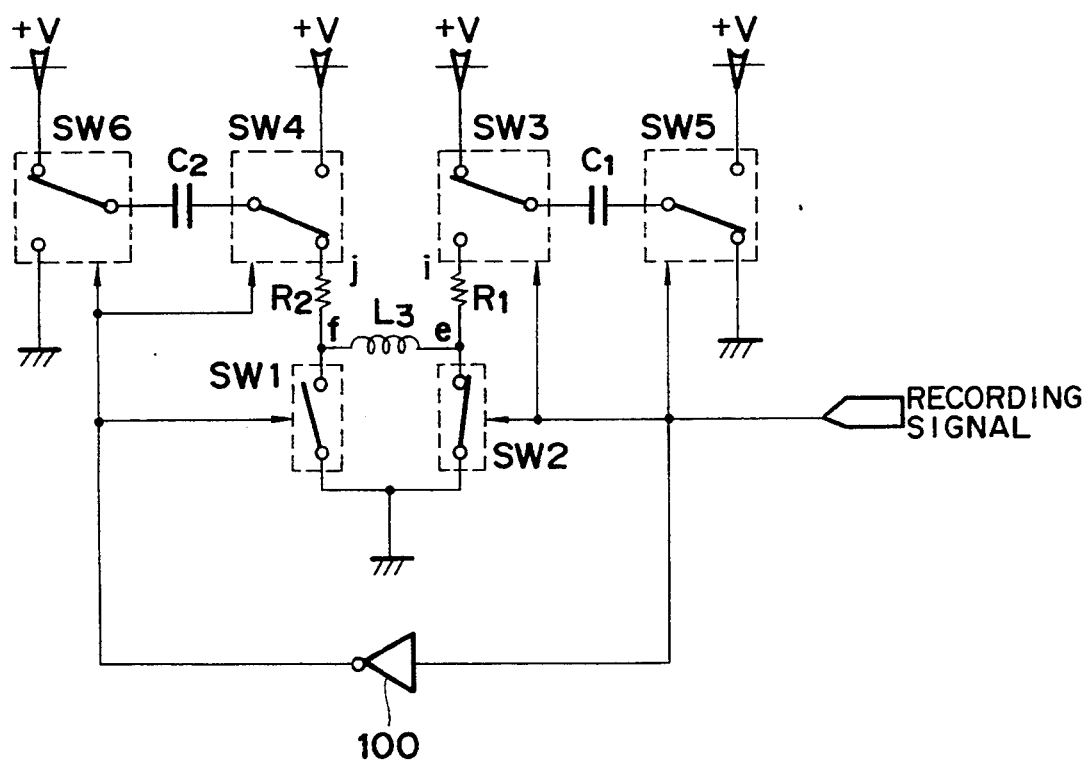
FIG. 9 is a circuit diagram showing another embodiment of the present invention.

FIG. 9 shows another embodiment of the present invention, exemplifying a magnetic head apparatus for generating a bias magnetic field by using one coil as in FIG. 3. The same reference numerals as in FIGS. 3 and 5 denote the same parts in FIG. 9, and a detailed description thereof will be omitted.

Arrangements of capacitors $C_1$ and $C_2$ and switch elements SW3 to SW6 connected to their two terminals in FIG. 9 are the same as those in FIG. 5. The switches SW1 and SW2 are symmetrical with those in FIG. 5 about a vertical line. In this embodiment, the switch elements SW3 and SW5 are operated in synchronism with the switch element SW2, and the switch elements SW4 and SW6 are operated in synchronism with the operation of the switch element SW1 in accordance with the recording signals. The switch elements are switched to control charging and discharging of the capacitors $C_1$ and $C_2$. The coil $L_3$ is driven at a voltage twice the power source voltage in the same manner as in the above embodiment.

Figure 10:
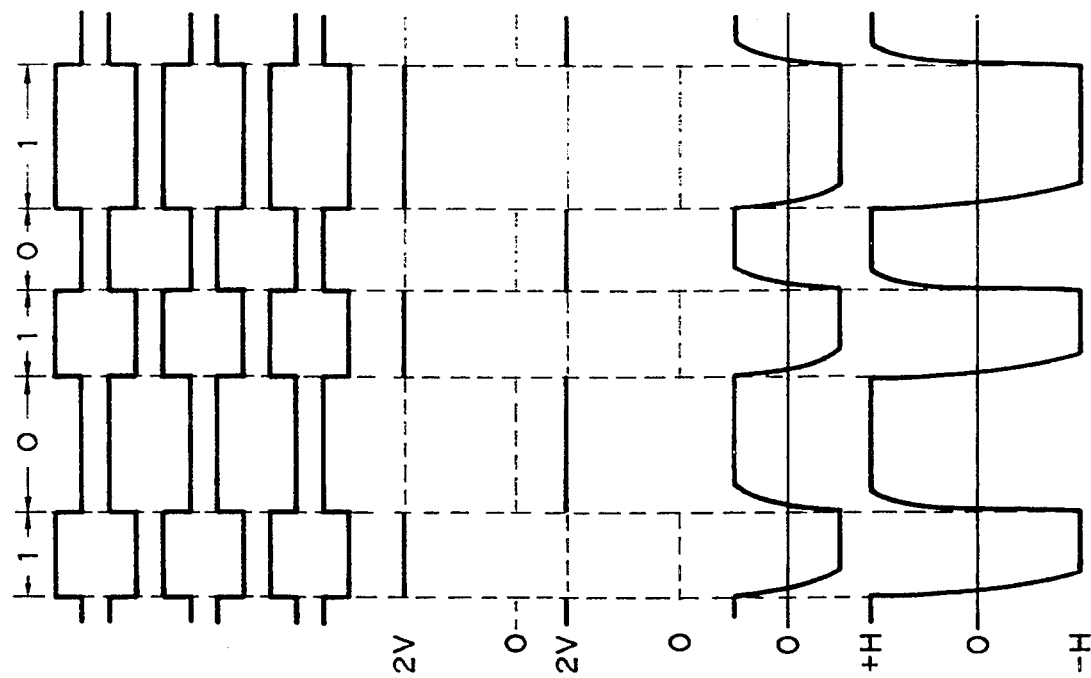
FIGS. 10A to 10K are timing charts showing an operation of the embodiment shown in FIG. 9.

FIGS. 10A to 10K are timing charts showing a detailed operation of the embodiment shown in FIG. 9. FIG. 10A shows a recording signal, and FIGS. 10B to 10G are voltage signals respectively supplied to the switch elements SW1 to SW6. When the recording signal is set at level "1", the switch element SW2 is turned on, the switch element SW3 is connected to the power source side, and the switch element SW5 is connected to ground, thereby obtaining the state in FIG. 9. The capacitor $C_1$ is charged and is ready to discharge the charge to the coil $L_3$. On the other hand, the switch element SW1 is kept off, the switch element SW4 is connected to a resistor $R_2$, and the switch element SW6 is connected to the power source side, thereby obtaining a state shown in FIG. 9. A current path from the power source to ground in an order of the capacitor $C_2$, the coil $L_3$, and the switch element SW2 is formed. A current is supplied to the coil $L_3$, as shown in FIG. 10J. In this case, the capacitor $C_2$ is charged to almost the power source voltage, and a voltage at a point j is twice the power source voltage, as shown in FIG. 10H. In this embodiment, therefore, as described above, the coil is driven at a voltage twice the power source voltage. As a result, a magnetic field shown in FIG. 10K is generated by the coil $L_3$. When this field is applied to the information recording medium, bit information corresponding to the recording signal of level "1" is recorded.

When the recording signal goes to level "0", the switch element SW2 is turned off, and the switch element SW1 is turned on. The switch element SW3 is connected to the resistor $R_1$, and the switch element SW5 is connected to the power source side in synchronism with these operations of the switch elements SW1 and SW2. In addition, the switch element SW4 is connected to the resistor $R_2$, and the switch element SW6 is connected to ground. The capacitor $C_2$ is charged again, and the capacitor $C_1$ is discharged. The charge of the capacitor $C_1$ is supplied to the coil $L_3$. In this case, a potential at a point i of FIG. 9 is twice the power source voltage, as shown in FIG. 10I. A current flows through the coil $L_3$ in an opposite direction, as shown in FIG. 10J. The direction of the magnetic field is also opposite, as shown in FIG. 10K. The generated magnetic field is applied to the recording medium, and bit information corresponding to the recording signal of level "0" is recorded. As described above, according to this embodiment, the capacitor is charged, and the charge is supplied to the coil. The coil can be driven at a voltage twice the power source voltage, thereby obtaining the same effect as in the embodiment of FIG. 5.

Figure 11:
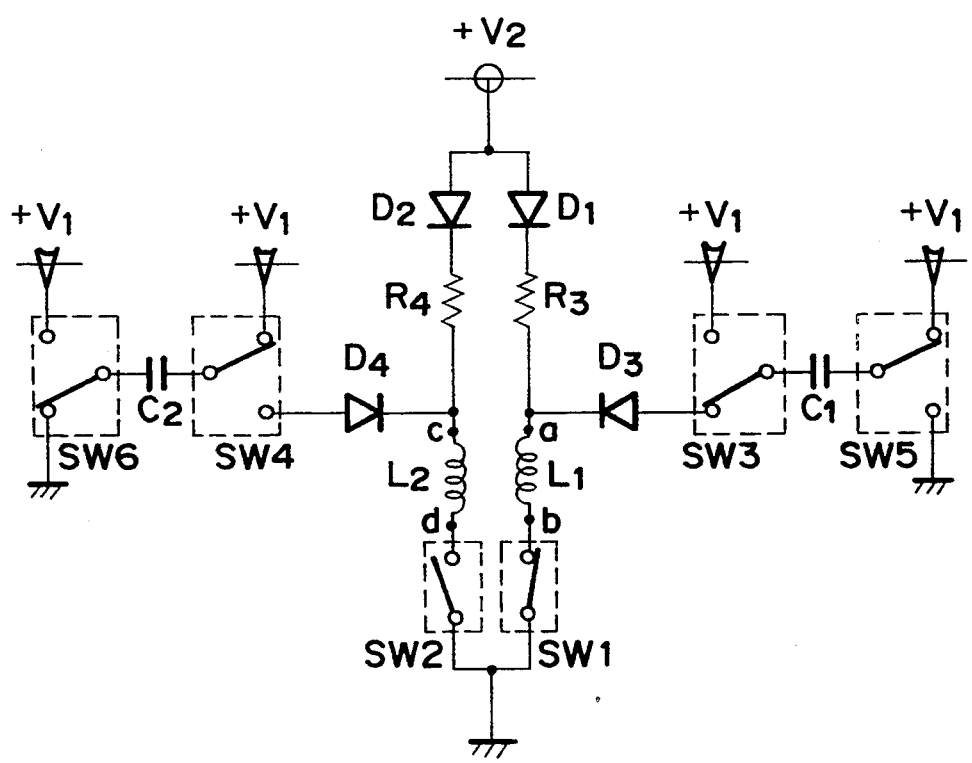
FIG. 11 is a circuit diagram showing still another embodiment of the present invention.

FIG. 11 is a circuit diagram showing still another object of the present invention. This embodiment is a modification of the embodiment of FIG. 5. The embodiment of FIG. 11 has a characteristic feature in that currents are supplied from the capacitors to coils $L_1$ and $L_2$ only during rise times of the currents. The same reference numerals as in FIG. 5 denote the same parts in FIG. 11.

Referring to FIG. 11, a drive apparatus includes the coils $L_1$ and $L_2$ serving as bias magnetic field generating coils, coil drive capacitors $C_1$ and $C_2$, and switch elements SW1 and SW2 operated by recording signals. The functions of the above components are the same as those in the embodiment of FIG. 5. Switch elements SW2 to SW6 control charging/discharging of the capacitors as in the previous embodiments. These switch elements are controlled by a timing control circuit (not shown) to supply capacitor charges to the corresponding coils only during rise times of the currents. In this embodiment, a voltage of a power source for charging the capacitors $C_1$ and $C_2$ is defined as $V_1$, a power source voltage for the coils $L_1$ and $L_2$ is $V_2$, and the voltages $V_1$ and $V_2$ satisfy the condition $V_1 > V_2$. The drive apparatus also includes reverse blocking diodes $D_1$ to $D_4$.

Figure 12:
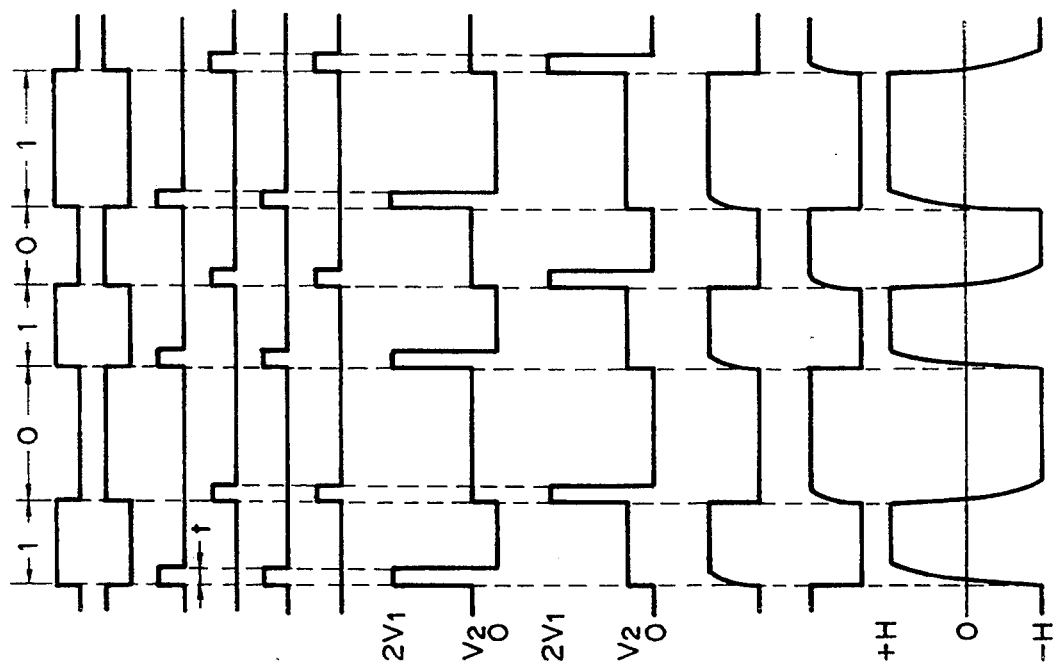
FIGS. 12A to 12L are timing charts showing an operation of the embodiment shown in FIG. 11.

FIGS. 12A to 12L are timing charts showing an operation of the above embodiment. FIG. 12A shows a recording signal, FIG. 12B shows a signal supplied to the switch element SW1, and FIG. 12C shows a signal supplied to the switch element SW2. When the recording signal is set at level "1", the switch element SW1 is ON, and the switch element SW2 is OFF. FIGS. 12D to 12G show signals respectively supplied to the switch elements SW3 to SW6. Each of these signals has a pulse width t. This pulse width t is set almost equal to the current rise time of each of the coils $L_1$ and $L_2$. When the recording signal is set at level "1", the switch element SW1 is turned on, and the switch elements SW3 and SW4 are set in a state shown in FIG. 11. At this time, the switch element SW2 is turned off, and the switch elements SW4 and SW6 are set in a state shown in FIG. 11. The charge of the capacitor $C_1$ is supplied to the coil $L_1$, and a current is supplied to the coil $L_1$, as shown in FIG. 12J. In this case, a voltage at a point a in FIG. 11 is $2V_1$, which is twice the power source voltage $V_1$, as shown in FIG. 12H. A time required to double the voltage is almost equal to the rise time of the current flowing through the coil $L_1$. Therefore, a high voltage can be applied to the coil $L_1$ during only the rise time of the current. In addition, no resistance is present in a current path, and the current rise time for the coil $L_1$ can be greatly shortened. When the time t has elapsed, the power source voltage $V_2$ is applied to the coil $L_1$.

During this period, the capacitor $C_2$ is charged to the power source voltage $V_1$ to prepare for the supply of the current to the coil $L_2$. When the recording signal goes to level "0", the switch element SW2 is turned on, the switch elements SW4 and SW6 are connected in directions opposite to those shown in FIG. 11, and a current is supplied from the capacitor $C_2$ to the coil $L_2$. At this time, a voltage at a point c is doubled to $2V_1$ during the time t, as shown in FIG. 12I. The coil $L_2$ is driven at the voltage twice the power source voltage during the rise time of the current, and FIG. 12K shows the current of the coil $L_2$ at this time. When the time t has elapsed, the power source voltage $V_2$ is applied to the coil $L_2$. A high voltage is similarly applied to the coil $L_2$ during only the current rise time, thereby greatly shortening the current rise time. Meanwhile, the capacitor $C_1$ is charged again to prepare for the supply of the current to the coil $L_1$. FIG. 12L shows the magnetic field generated by the coil $L_1$ or $L_2$. This generated magnetic field is applied to the information recording medium, and pieces of bit information corresponding to the recording signals of levels "1" and "0" are recorded.

In this embodiment, a high voltage is applied to each of the coils $L_1$ and $L_2$ during only the current rise time, and no resistance is present in the current supply path. The current rise time of each coil can be greatly shortened as compared with conventional cases. When the charge of each capacitor is to be supplied to the corresponding coil, the energy stored in the capacitor can be effectively used due to the absence of the resistance in the current path, thereby reducing the total power consumption.

Figure 13:
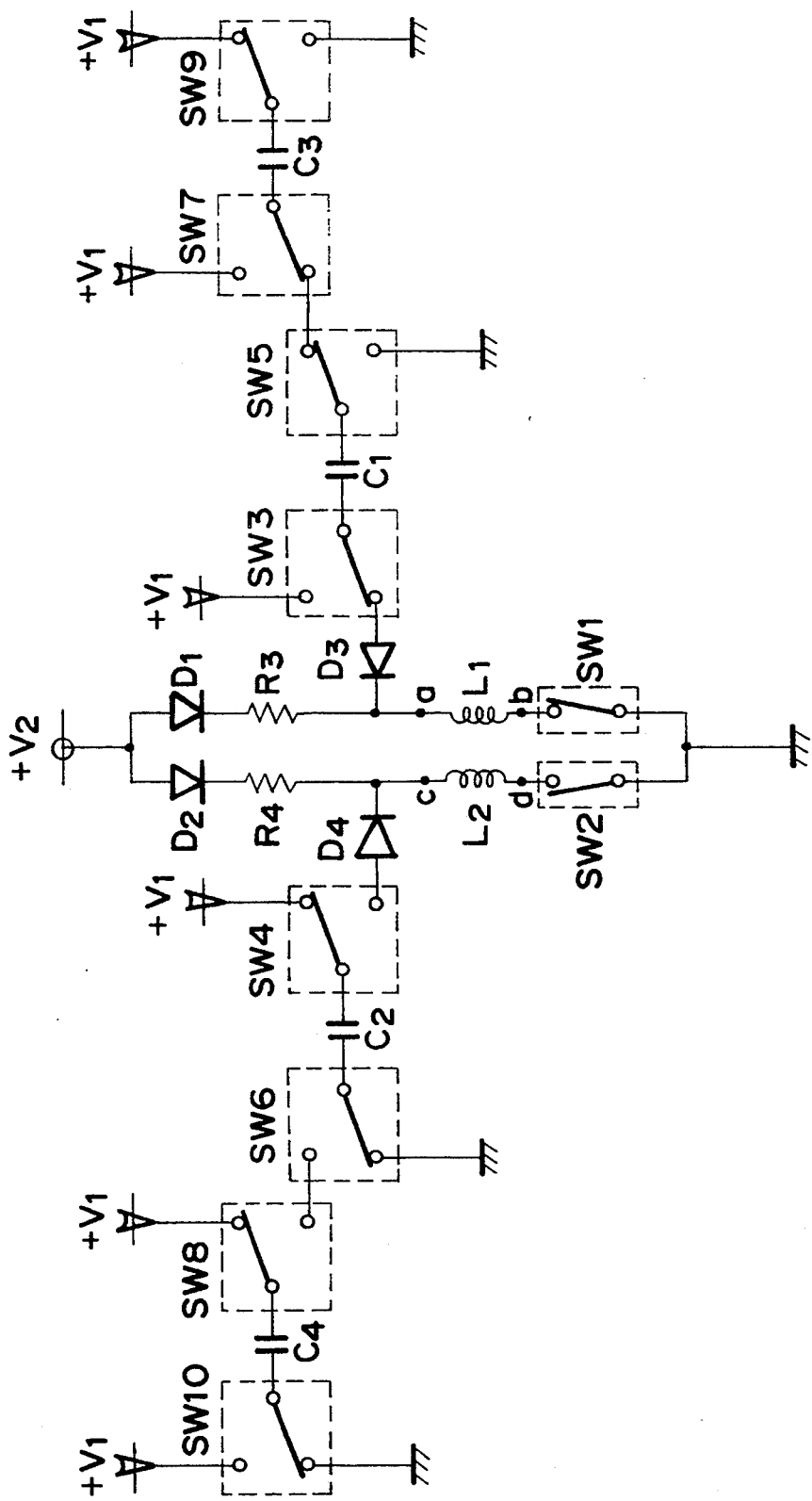
FIG. 13 is a circuit diagram showing still another embodiment of the present invention.

FIG. 13 shows still another embodiment of the present invention. This embodiment is a modification of FIG. 11. Only one capacitor is used for each coil in the embodiment of FIG. 11. However, in the embodiment of FIG. 13, two capacitors are used for each coil to supply a current thereto.

A capacitor $C_3$ is connected in series with a capacitor $C_1$, and a capacitor $C_4$ is connected in series with a capacitor $C_2$. During current supply to each coil, each pair of capacitors are connected in series with each other, so that a voltage three times the power source voltage is applied to each coil. The capacitors $C_1$ and $C_3$ and the capacitors $C_2$ and $C_4$ are charged parallel to each other. Charging/discharging of the capacitor $C_3$ is controlled by switch elements SW7 and SW9. Charging/discharging of the capacitor $C_4$ is controlled by switch elements SW8 and SW10. A relationship between power source voltages $V_1$ and $V_2$ satisfies the condition $V_1 > V_2$. Other arrangements in FIG. 13 are the same as those in FIG. 11.

FIGS. 14A to 14L are timing charts showing an operation of the embodiment in FIG. 13. FIG. 14A shows a recording signal, and FIGS. 14B and 14C show signals respectively supplied to the switch elements SW1 and SW2, as in the embodiment of FIG. 11. Signals shown in FIGS. 14D to 14G are supplied to switch elements SW3 to SW6 and the switch elements SW7 to SW10, all of which serve to control charging/discharging of the corresponding capacitors. In this embodiment, the switch elements SW3 and SW7 and the switch elements SW5 and SW9 are simultaneously switched. The switch elements SW4 and SW8, and the switch elements SW6 and SW10 are simultaneously switched. When the recording signal is set at level "1", the switch element SW1 is ON, and the switch SW2 is OFF. In this case, the switch elements SW3 and SW5 and the switch elements SW7 and SW9 are set in a state shown in FIG. 13. In this state, the capacitors $C_1$ and $C_3$ are connected in series with each other. This connecting time is set equal to a time t as the current rise time of the coil $L_1$ in the same manner as in FIG. 11.

The capacitors $C_1$ and $C_3$ are charged to the power source voltage $V_1$ each. A voltage at a point a is three times the power source voltage $V_1$, as shown in FIG.

14H. In this embodiment, the voltage three times the power source voltage can be applied during the current rise time of the coil $L_1$. The current rise time of the coil $L_1$ can be further shortened. When the time t has elapsed, the power source voltage $V_2$ is applied to the coil $L_1$. In this period, the switch elements SW4 and SW8 and the switch elements SW6 and SW10 for controlling the capacitors $C_2$ and $C_4$ are set in the state shown in FIG. 13. The capacitors $C_2$ and $C_4$ are charged with the power source voltage $V_1$ in a parallel manner.

When the recording signal is set at level "0", the switch element SW1 is turned off, and the switch element SW2 is turned on. The capacitor control switches SW3 to SW10 are connected in a state opposite to that shown in FIG. 13. In this case, the capacitors $C_2$ and $C_4$ are connected in series with each other. The charges of the capacitors $C_2$ and $C_4$ cause a current to flow in the coil $L_2$. FIG. 14I shows a voltage at a point c. During the time t, the voltage is three times the power source voltage. During the current rise time of the coil $L_2$, the voltage three times the power source voltage is applied, so that the current rise time of the coil $L_2$ is shortened. Meanwhile,, the capacitors $C_1$ and $C_3$ are charged again to prepare for the next current supply cycle. FIG. 14J shows the current of the coil $L_1$, FIG. 14H shows the current of the coil $L_2$, and FIG. 14L shows the generated magnetic field.

As described above, according to this embodiment, since a current is supplied to each coil by using a pair of capacitors, a voltage three times the power source voltage can be applied to the coil during the current rise time. The current rise time of the coil can be shortened, as compared with the embodiment shown in FIG. 11. In the embodiment shown in FIG. 13, each coil is driven using a pair of capacitors. However, a coil can be driven using three or more series-connected capacitors. In the embodiments of FIGS. 5 and 9, it is possible to supply a current to a coil by using a plurality of capacitors.

According to the present invention, as has been described above, since the bias magnetic field generation coil is driven by utilizing charge stored in the capacitor, a voltage including the charge voltage of the capacitor and higher than the power source voltage can be applied to the coil. Therefore, a large current is supplied to the coil. Even if an inductance of a coil is large, the switching time of the coil can be shortened by an increase in voltage applied thereto. In addition, a high power source for a coil need not be arranged. The above effects can be obtained by a simple apparatus including a capacitor and a switching element.

What is claimed is:

1. A drive circuit apparatus for driving a magnetic head, comprising:
   a magnetic core;
   a coil wound around said magnetic core; and
   supplying means, coupled to said coil, for supplying a current to said coil, said supplying means comprising first and second capacitors and charging means coupled to said first and second capacitors said charging means (i) charging said second capacitor while supplying the current to said coil by a charge stored in said first capacitor and (ii) charging the first capacitor while supplying the current to said coil by a charge stored in said second capacitor.

2. An apparatus according to claim 1, wherein said supplying means further comprising control means for receiving a recording signal and controlling said charging means to generate magnetic field in response to the recording signal.

3. An apparatus according to claim 2, wherein a capacitance C of said first and second capacitors, an inductance L of said coil, and a maximum magnetic field reversal time T during recording of information on the information recording medium satisfy the following condition:

$$C > T^2/1000 \times L$$

4. An apparatus according to claim 1, further comprising a power source, and wherein said charging means Comprises switch means, coupled to said power source, for connecting said first and second capacitors in parallel during charging by said charging means, and for connecting said first and second capacitors in series during a discharging of said coil.

5. An apparatus according to claim 1, wherein said supplying means comprises means for supplying the current from said first and second capacitors to said coil during a current rise time of said coil.

6. A method of driving a magnetic head having a coil, comprising the steps of:
   providing a circuit including first and second capacitors, which are coupled to the coil, for supplying a current to the coil;
   selectively driving the magnetic head by selectively supplying current from at least one of the first and second capacitors to the coil;
   charging the second capacitor when current is supplied to the coil by a charge stored in the first capacitor; and
   charging the first capacitor when current is supplied to the coil by a charge stored in the second capacitor.

7. A method of driving a magnetic head having a coil, comprising the steps of:
   providing a circuit, which includes first and second capacitors coupled to the coil, for supplying a current to the coil;
   supplying current to the magnetic head coil from one of the first capacitor and the second capacitor;
   charging the second capacitor from a power supply when the coil is supplied with current from the first capacitor; and
   charging the first capacitor from the power supply when the coil is supplied with current from the second capacitor.

8. A drive circuit apparatus for driving a magnetic head, comprising:
   a magnetic core;
   a first coil wound around said magnetic core;
   a second coil wound around said magnetic core;
   a first capacitor for supplying a current to said first coil;
   a second capacitor for supplying a current to said second coil;
   a power source;
   a first switch device provided between said first coil and said first capacitor and between said power source and said first capacitor; and
   a second switch device provided between said second coil and said second capacitor and between said power source and said first capacitor.

9. A drive circuit apparatus for driving a magnetic head, comprising:
   a magnetic core;

a first coil wound around said magnetic core;
a second coil wound around said magnetic core;
a first capacitor for supplying a current to said first coil;
a second capacitor for supplying a current to said second coil;
a power source;
a first switch device connected to one terminal of said first capacitor, said first switch device being connected to one of said power source and said first coil;
a second switch device connected to one terminal of said second capacitor, said second switch device being connected to one of said power source and said second coil;
a third switch device connected to the other terminal of said first capacitor, said third switch device being connected to one of said power source and ground; and
a fourth switch device connected to the other terminal of said second capacitor, said fourth switch device being connected to one of said power source and ground.

* * * * *

UNITED STATES PATENT AND TRADEMARK OFFICE
CERTIFICATE OF CORRECTION

PATENT NO. : 5,448,422
DATED : September 5, 1995
INVENTOR(S) : MAKOTO HIRAMATSU

It is certified that error appears in the above-indentified patent and that said Letters Patent is hereby corrected as shown below:

COLUMN 5:

Line 37, "into" should read --by--.

COLUMN 9:

Line 60, "capacitors" should read --capacitors,--.
Line 67, "comprising" should read --comprises--.

COLUMN 10:

Line 1, "magnetic" should read --a magnetic--.
Line 10, "$C>T^2/1000xL$" should read --"$C>T^2/1000xL$.--

Line 14, "Comprises" should read --comprises--.

Signed and Sealed this

Twenty-seventh Day of February, 1996

Attest:

BRUCE LEHMAN

Attesting Officer     Commissioner of Patents and Trademarks